March 10, 1959 S. S. BROWN 2,876,641
FLUID MEASURING APPARATUS
Filed March 14, 1955 3 Sheets-Sheet 1

INVENTOR.
Stephen S. Brown,
BY
Frank S. Troidl
ATTORNEY.

March 10, 1959  S. S. BROWN  2,876,641
FLUID MEASURING APPARATUS

Filed March 14, 1955  3 Sheets-Sheet 3

INVENTOR.
Stephen S. Brown,
BY
Frank S. Troidl
ATTORNEY.

United States Patent Office 2,876,641
Patented Mar. 10, 1959

2,876,641

FLUID MEASURING APPARATUS

Stephen S. Brown, Houston, Tex., assignor, by mesne assignments, to Jersey Production Research Company, Tulsa, Okla., a corporation of Delaware Application March 14, 1955, Serial No. 493,929

8 Claims. (Cl. 73—221)

This invention relates to an apparatus for measuring the volume of fluids filling a vessel. More particularly, this invention relates to a system utilized to measure the amount of liquid contained in a fluid flowing under pressure containing both liquids and gases and a system for measuring the volume of gas flowing in a gas line.

In the measurement of the volume of a liquid, which is discharged from a vessel, the practice has been to fill a calibrated vessel up to an index or line on said vessel. When the liquid, which is filling the vessel, reaches the index or line, the liquid is dumped, usually by means of a liquid discharge valve, and the volume thus dumped is recorded. For example, if the vessel is calibrated to hold 100 gallons of liquid, the number of times the vessel is dumped multiplied by 100 gallons is supposed to give the operator the amount of liquid discharged. However, the actual amount of liquid recorded usually is not the true amount. This is particularly true when, due to the increased age of the system, the valves in these systems begin to wear out, and dirt and sand contained in the flow line, begin to interfere with the proper operation of the valves. It has been found, through experience in utilizing these previous systems, that the flow to the measuring vessel is not cut off exactly when the liquid reaches the index. It has also been found, through experience, that the total amount of liquid, which is contained in the vessel, it not all discharged through the liquid discharge valve; some of the liquid may be retained in the vessel and hence be recounted as part of the volume. Under many circumstances, particularly in the measurement of the volume of crude oil contained in a flow of fluids containing both crude oil and natural gases flowing from a producing well, the exact determination of the crude oil content of the flowing fluids is absolutely necessary.

The measurement of the volume of a gas flowing under high pressure is very difficult and inaccurate results are often obtained. Hence, any system which is very accurate in its measurement of the volume of a gas flowing under high pressure is highly desirable.

It is an object, therefore, of my invention to provide an improved system for measuring the volume of fluids, either gaseous or liquid, flowing under pressure. When used to measure the amount of liquid contained in a fluid containing both liquids and gases, my invention consists of a vessel, or plurality of vessels, into which the liquids and natural gases contained in a flow line are flowed. By utilizing a plurality of vessels rather than a single vessel it is possible to discharge the liquid content of one vessel while simultaneously filling a second vessel to thereby provide for the uninterrupted flow of the liquid to stock tanks in which the liquid is stored. However, I do not wish to limit my invention to a plurality of vessels because my new apparatus for measuring the exact amount of liquid filling each vessel may be practiced utilizing only one vessel. However, for the purposes of explanation, my invention will be described as though a plurality of vessels are being employed.

Included in the system are a plurality of diaphragm valves for each measuring vessel. There is both a fluid valve and a liquid discharge valve for each measuring vessel. The fluid valve is opened or closed to permit or prevent, respectively, the entrance of the fluids from the flow line into the vessel. The liquid discharge valve is utilized to permit the discharge of the liquid content of the fluids from the vessel. Also included in each vessel is a gas discharge regulator, which is connected to a conduit, for conducting the gases to a gas storage tank. The gaseous content of the vessel is conducted through the gas discharge regulator to the conduit. Also included in my new system is a means for opening and closing the plurality of valves contained in the system at the proper time. For example, when two vessels are employed, the means for opening and closing the plurality of valves maintains the fluid valve of the first vessel open and maintains the liquid discharge valve of the first vessel closed while the first vessel is being filled with fluid and at the same time keeps the fluid valve of the second vessel closed and the liquid discharge of the second vessel open to permit the discharge of liquid from the second vessel (which has been previously filled with fluid) while the first vessel is being filled with fluid. Means are also provided for automatically reversing the positions of the valves when the first vessel is filled with liquid and permit the discharge of liquid from the first vessel and the entrance of fluid into the second vessel.

Included in the new system is a means for measuring the amount of liquid entering each individual vessel while the liquid is increasing in volume. Any decrease in volume of the liquid contained in each individual vessel is not measured. Hence, the means for measuring the amount of liquid measures only the amount of increase in volume. Therefore, any lag in the operation of the valves or any interference in the operation of the valves due to dirt, sand and the like will not effect a true reading of the liquid measurement.

When used to measure the volume of gas flowing under pressure, my new system consists of two vessels with each of said vessels being partially filled with a liquid. Means are utilized to provide hydraulic communication between the two vessels so that any pressure, due to entering gas, against the liquid in one vessel will cause a decrease in volume of the liquid contained within said vessel and a corresponding increase in volume of the liquid contained in the second vessel. Means are also provided for alternately supplying gas to one of the vessels while discharging gas contained in the other vessel so as to maintain an uninterrupted flow of gas to gas storage tanks. A counter mechanism is associated wih each of the vessels to measure any rise of the liquid contained in each vessel. The amount of the rise in one vessel indicates the volume of gas which has entered the other vessel.

Other objects and a fuller understanding of the invention may be had by referring to the following description and claims taken in conjunction with the accompanying drawings in which:

Figure 1:
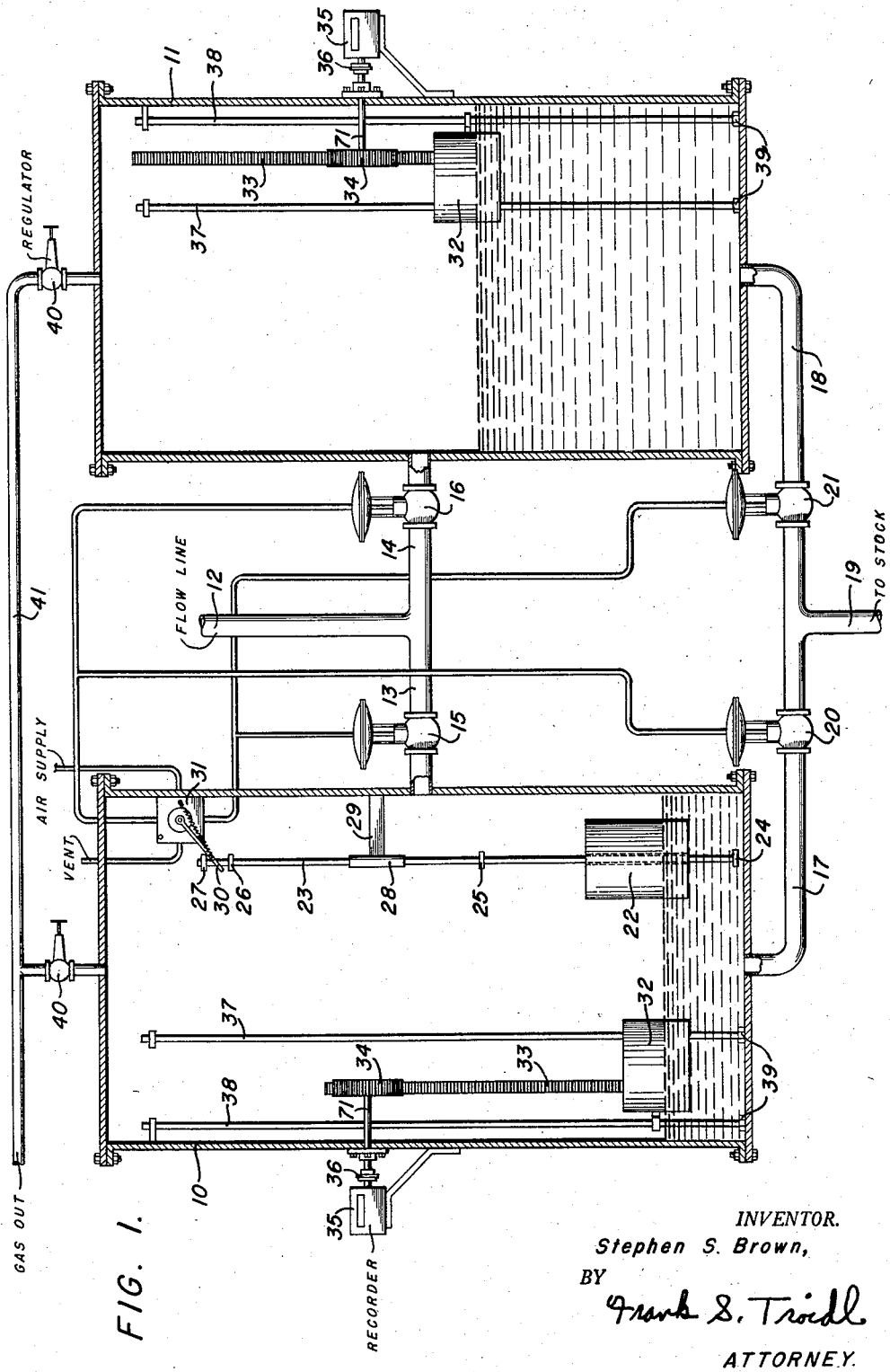
Fig. 1 is an elevational view partly in section showing an embodiment of my invention.

Referring to the drawings and more particularly to Fig. 1, numerals 10 and 11 are vessels into which a fluid, consisting of liquids and gases, is to be introduced. The fluids are introduced into the vessels 10 and 11 by means of a flow line 12. Flow line 12 has branches 13 and 14 with branch 13 leading into vessel 10 and branch 14 leading into vessel 11. The flow of the fluids alternately into vessels 10 and 11 is brought about by means of diaphragm valves 15 and 16. Diaphragm valve 15 is maintained open while vessel 10 is being filled with fluid and diaphragm valve 16 is kept closed. After vessel 10 is filled with the proper amount of liquid, diaphragm valve 15 is closed and diaphragm valve 16 is opened to permit the flow of fluid through branch 14 into the vessel 11.

Vessels 10 and 11 also have liquid conduits 17 and 18 respectively. The liquid conduits 17 and 18 are connected to liquid conduit 19 with liquid conduit 19 serving to conduit the liquid discharged from vessels 10 and 11 to stock tanks (not shown) for storage. Diaphragm valves 20 and 21 are utilized to control the discharge of liquids from vessels 10 and 11 respectively.

Diaphragm valves 16 and 20 are simultaneously opened or simultaneously closed, depending upon the position of a float 22 located within vessel 10. Float 22 also controls the level of liquid at which diaphragm valves 15 and 21 are opened or closed with diaphragm valves 15 and 21 also being closed simultaneously or opened simultaneously. Float 22 rides along a float guide 23. The float is slidably connected to the float guide 23 in order to permit the float 22 to ride along the float guide 23 in response to a change in the level of the liquid contained in vessel 10. Positioned on float guide 23 are pins 24, 25, 26 and 27 and a guide sleeve 28. The sleeve 28 is connected to the side of vessel 10 by means of a bracket 29. When the float 22 is in either its lowermost position or its uppermost position, an actuating arm 30 is contacted and moved through a 90° arc. The movement of actuating arm 30 operates a pilot valve 31. Pilot valve 31 serves to actuate a pneumatic system to reverse the position of diaphragm valves 20 and 16 and also pneumatically reverse the position of diaphragm valves 15 and 21.

Also included in each of vessels 10 and 11 is a counter actuating float 32; connected to each of the counter actuating floats 32 is a rack 33. The teeth of rack 33 engage a gear mechanism 34 to operate a recorder 35. The recorders 35 indicate directly any increase in the volume of liquid contained within its respective vessel. However, means are provided for preventing the counters 35 from operating when there is any decrease in the volume of liquid contained within a vessel. These means for preventing the indication of any decrease may include an overriding clutch mechanism 36 (to be described subsequently). By utilizing such a counter mechanism, the errors which are present, when any other type of liquid measuring means previously used are employed, due to valve lags and other defects will not be introduced in operating my system because only an increasing change in volume of liquid is registered. Floats 32 are guided by means of float guides 37 and 38. Float guides 37 and 38 are connected to the bottom of vessels 10 and 11 by means of nuts 39.

The gaseous content of the fluids introduced into vessels 10 and 11 are conducted through regulators 40 to a gas conduit 41 and from there conducted to gas storage tanks (not shown). The regulators 40 serve to maintain a constant pressure in the space above the liquid. This pressure serves to give an additional pressure to aid the discharge of liquids from the vessels in the event sand and dirt and the like get into the liquid conduits 17 and 18 to offer greater resistance to the discharge of liquid from vessels 10 and 11.

Figure 2:
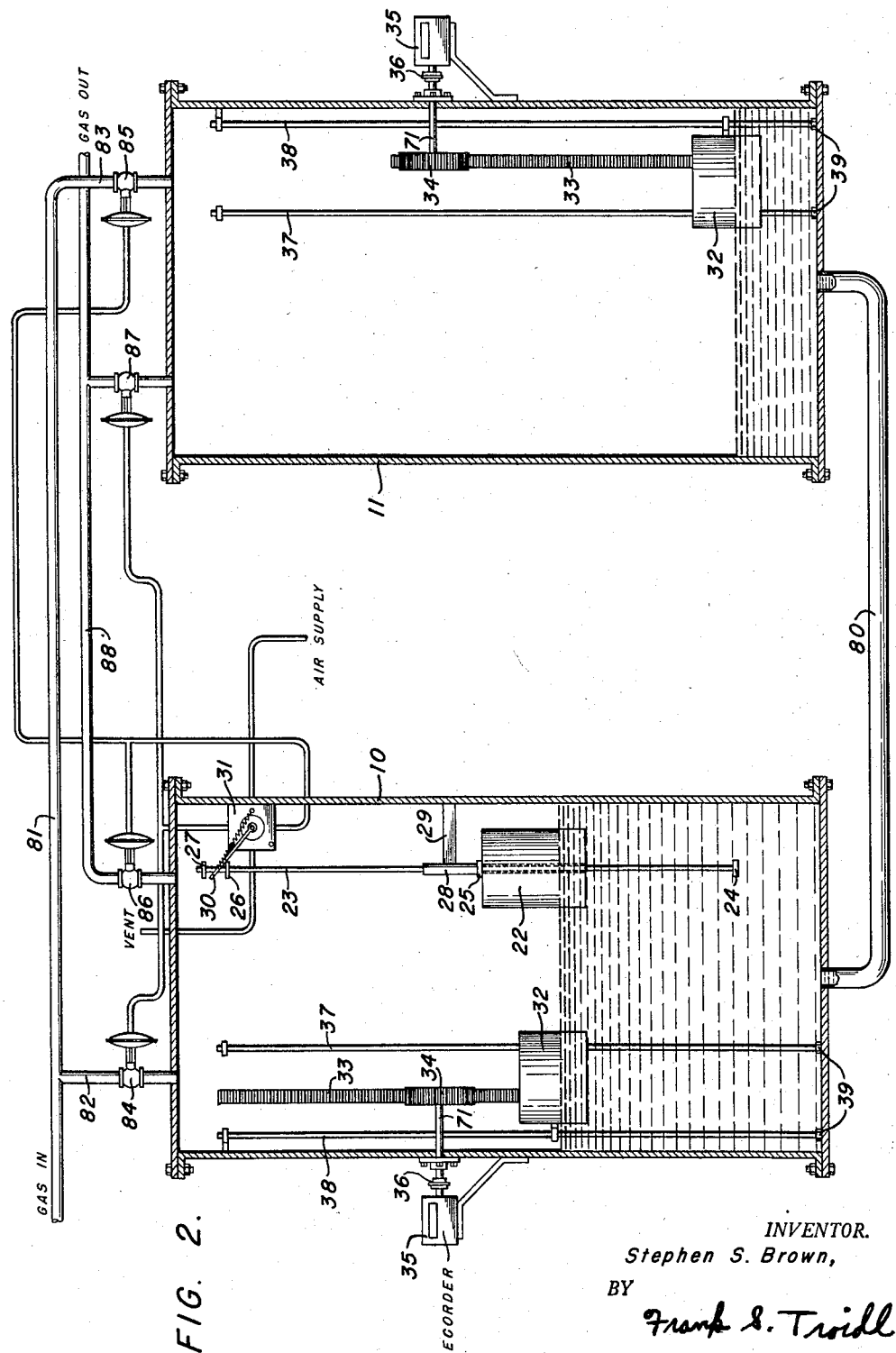
Fig. 2 is an elevational view partly in section showing a second embodiment of my invention.

Referring to Fig. 2, a modification is shown which can be used to measure the volume of a gas flowing under pressure. Vessels 10 and 11 are partially filled with a liquid, as shown. Interconnecting vessels 10 and 11 is a conduit 80. Conduit 80 serves to provide hydraulic communication between vessels 10 and 11. Gas is supplied from gas line 81 to the vessels 10 and 11 by means of gas conduits 82 and 83 respectively. The entrance of gas into vessel 10 is controlled by diaphragm valve 84. The entrance of gas into vessel 11 is controlled by diaphragm valve 85. Diaphragm valves 86 and 87 control the discharge of gas from vessels 10 and 11 through conduit 88 to gas storage tanks for storage. When actuating arm 30 is in the position as shown in Fig. 2 diaphragm valves 84 and 87 are simultaneously opened and diaphragm valves 85 and 86 are simultaneously closed to permit the entrance of gas into vessel 10 and the discharge of gas from vessel 11. The increasing volume of gas in vessel 10 causes the liquid level of vessel 10 to fall with a corresponding increase in the level of liquid in vessel 11.

Figure 3:
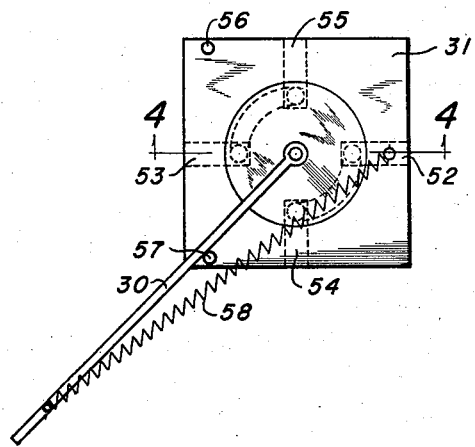
Fig. 3 is an elevational view of a pilot valve utilized in my new systems.
Figure 4:
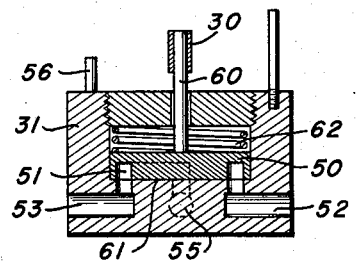
Fig. 4 is a sectional view taken along the line 4—4 of Fig. 3.
Figure 4A:
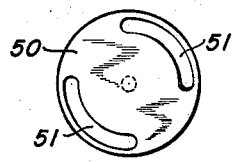
Fig. 4A is a bottom view of an element of the device of Figs. 3 and 4.

Figs. 3 and 4 show the body and valve disk of the pilot valve 31 (shown in Fig. 1). As shown in Figs. 3 and 4, actuating arm 30 is connected to a valve disk 50. Included in the valve disk 50 are two arcuate slots 51 which are arranged diagrammatically opposite to one another. Each arcuate slot 51 covers about a 90° arc. Included in the pilot valve 31 is an air supply port 52 and a bleed port 53. Bleed port 53 bleeds the air to the atmosphere. Also included in pilot valve 31 is a diaphragm port 54 which leads to diaphragm valve 15 and diaphragm valve 21 (see Fig. 1). Diaphragm port 55 leads to diaphragm valve 16 and diaphragm valve 20 (see Fig. 1). Stops 56 and 57 serve to limit the movement of actuating arm 30. The arcuate slots 51 are positioned on the valve disk 50 so as to connect each diaphragm port alternately with the atmosphere or the supply port 52. To aid in the movement of actuating arm 30, I include an off-center spring 58 which is mounted on actuating arm 30.

Fig. 4 shows a sectional view of the pilot valve taken along line 4—4 of Fig. 3. As shown in Fig. 4, actuating arm 30 is connected to valve disk 50 by means of a connecting arm 60. Valve disk 50 is biased against a shoulder 61 within the pilot valve 31 by a compression spring 62. The force of compression spring 62 against valve disk 50 is not great enough to prevent rotational movement of valve disk 50 in response to the movement of actuating arm 30.

Figure 5:
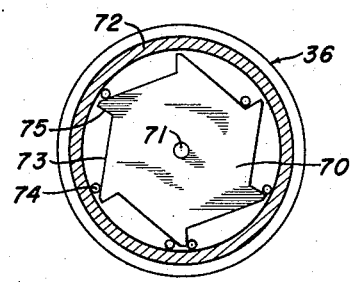
Fig. 5 shows an overriding clutch mechanism which might be utilized in my new system.

The overriding clutch mechanism can be of several designs. One overriding clutch mechanism, suitable for use in my new system, is shown in Fig. 5. The overriding clutch mechanism 36 consists of a disk 70 which is rigidly attached to the shaft 71. Shaft 71 is connected to gear 34 and rotates with gear 34. Housing 72 is connected to a second shaft, with the second shaft being connected to the counter mechanism 35 (see Fig. 1 and Fig. 2). The disk 70 has a plurality of slots 73. The slots 73 are cut so that they do not follow the radius of the circle of the disk but are at an angle with any radius. Included in each slot 73 is a roller 74. When the shaft 71 rotates in a clockwise direction, as shown in Fig. 5, some of the rollers will be cammed against the housing 72, thereby rotating the shaft connected to counter mechanism 35. When shaft 71 rotates in a counter clockwise direction all of the rollers 74 will rest on shoulders 75 of the disk 70. When the rollers 74 rest on shoulders 75 the rotational force of disk 70 is not transmitted to housing 72. Therefore, the shaft connected to housing 72 is not rotated and the counter mechanism is not operated. Shaft 71 will rotate in the one direction in response to an upward movement of float 32 thereby actuating counter mechanism 35. However, upon any decreasing change in liquid level of the liquid contained within either of the vessels 10 or 11 (see Fig. 1) shaft 71 will be rotated in the opposite direction and the counter mechanism 35 will not be operated. Since the vessel in which the float operates is calibrated, the numbers on the counting mechanism are a direct indication of the total volume swept by the float in its entire upward travel.

In the operation of the system shown in Fig. 1 let it be assumed that it is desired to fill vessel 10 with liquid while vessel 11, which has been previously filled with a liquid, is being discharged. The positions of float 22 and floats 32 are as shown in Fig. 1. The position of the actuating arm 30 of pilot valve 31 is as shown in Fig. 3. Air pressure from supply 52 will then be supplied through diaphragm port 54 to diaphragm valves 15 and 21 thereby opening said valves to permit the flow of fluids into vessel 10 and also to permit the discharge of the liquid contained in vessel 11 through conduits 18 and 19 to the stock tanks. As the liquid in vessel 10 rises, floats 22 and 32 in vessel 10 will also rise. As float 32 rises in tank 10, the counter 35 indicates the increase in volume. However, if for any reason such as a failure of a valve contained within my new system, the volume of liquid in vessel 10 should decrease, the decrease is not recorded on recorder 35 because of the overriding clutch mechanism. As float 22 rises it contacts pin 25 and then pin 26 contacts actuating arm 30 to thereby rotate valve disk 50 to position the arcuate slots 51 so as to connect valve 54 with the atmosphere port 53 and at the same time connect diaphragm port 55 with the source of air pressure 52. Air pressure will then be supplied to diaphragm valve 20 thereby opening said valve and air pressure will also be supplied to diaphragm valve 16 thereby opening valve 16. Simultaneously, the air pressure in diaphragm port 54 is bled to the atmosphere thereby closing diaphragm valves 15 and 21. The fluids from flow line 12 are then conducted through conduit 14 into vessel 11 while the liquid in vessel 10 is being discharged through conduits 17 and 19 to the stock tanks. As the liquid from vessel 10 decreases in volume float 22 will impinge upon pin 24 and cause pin 27 to return actuating arm 30 to its position as shown in Fig. 1. The cycle of operation is then repeated.

In the operation of the system shown in Fig. 2 let it be assumed the floats 22 and floats 32 are in the position as shown in Fig. 2. The actuating arm 30 having been actuated by pin 26 moves the pilot valve disk to a position so as to provide for the supply of air to diaphragm valves 84 and 87 to thereby open diaphragm valves 84 and 87 and at the same time bleeds air from diaphragm valves 86 and 85 to thereby close diaphragm valves 86 and 85. Gas from gas line 81 will enter vessel 10 and the volume of this gas will displace the liquid contained in vessel 10 to cause a rise in the liquid level of the liquid contained in vessel 11. Float 32, which is connected to the counter mechanism 35 by means of rack 33 and gears 34, will rise with the liquid level and the volume of the liquid displaced will be indicated on counter 35. The volume of the liquid displaced is substantially equal to the volume of gas entering vessel 10. When the liquid level of vessel 10 decreases a predetermined amount, the float 22 will sequentially contact pin 24 and move pin 27 against actuating arm 30. The movement of actuating arm 30 will rotate the pilot valve disk 90° to connect the air supply with diaphragm valves 86 and 85 thereby opening valves 86 and 85 and connect the bleed port with diaphragm valves 84 and 87 thereby closing valves 84 and 87. Gas is then flowed into vessel 11 and the gas contained in vessel 10 is discharged through gas valve 86 to the gas storage tanks. The cycle of operation is then repeated.

Although I have described my invention with a certain degree of particularity, it is understood that the present disclosure has been made only by way of example and that numerous changes in the details of construction and the combination and arrangement of parts may be restored to without departing from the spirit and the scope of the invention as hereinafter claimed.

I claim:

1. In an apparatus for measuring the amount of liquid contained in a flowing fluid containing both liquids and gases: at least two vessels, each of said vessels having a fluid inlet, a liquid outlet, and a gas outlet; means connected to said fluid inlet for initially filling one of said vessels with said fluid; means for thereafter alternately filling one of said vessels with said fluid while discharging the liquid content of the fluid contained in another of said vessels; a float disposed in each vessel; a recording means mounted outside each vessel; a recording means actuating shaft extending from within the vessel to the recording means, said shaft having means therein permitting actuation of the recording means continuously only during an increasing liquid level in the vessel.

2. An apparatus in accordance with claim 1 wherein said means for initially filling one of said vessels with said fluid includes: a first fluid flow control valve, said first control valve being initially in open position to permit the flow of fluid into the vessel being initially filled with fluid; and a second fluid flow control valve, said second control valve being initially in closed position to prevent the flow of fluid to the other of said vessels.

3. An apparatus in accordance with claim 2 wherein said means for thereafter alternately filling one of said vessels with said fluid while discharging the liquid contained in another of said vessels includes: a first liquid discharge valve in the liquid outlet of said vessel being initially filled with fluid, said first liquid discharge valve being initally in closed position; a second liquid discharge valve in the liquid outlet of said other vessel, said second liquid discharge valve being initially in open position; and means connected to each of said valves for simultaneously changing the positions of all of said valves.

4. An apparatus in accordance with claim 3 wherein said means for simultaneously changing the positions of all of said valves includes: a float disposed within one of said vessels; and pneumatic means responsive to predetermined positions of said float for changing the positions of said valves.

5. In an apparatus for measuring the volume of gas flowing under pressure: at least two vessels, each of said vessels containing liquid; liquid communication means between said vessels; each of said vessels having a gas inlet and a gas outlet; means connected to the gas inlets and to the gas outlets for alternately supplying gas to one of said vessels while discharging gas contained in another of said vessels; a float within each vessel responsive to liquid volume change; a recording means connected to each vessel; means including a rotatable shaft system interconnecting the float and the recording means, said shafts being fixed against axial movement; and means in the shaft system permitting the recording of liquid volume changes in one direction only.

6. An apparatus in accordance with claim 5 wherein said means for alternately supplying gas to one of said vessels while discharging gas contained in another of said vessels includes: a first gas flow control valve in open position to permit the flow of gas into one of said vessels; a second gas flow control valve in closed position to prevent the flow of gas to the other of said vessels; a first gas discharge valve in closed position to prevent the discharge of gas from the vessel being supplied gas; a second gas discharge valve in open position to permit the discharge of gas from another of said vessels; and means connected to each of said valves for simultaneously changing the positions of all of said valves.

7. An apparatus in accordance with claim 6 wherein said means for simultaneously changing the positions of all of said valves includes: pneumatic means responsive to predetermined positions of said floats for changing the positions of said valves.

8. In an apparatus for measuring volume of a fluid: at least two vessels, each of said vessels having a fluid inlet and a fluid outlet; means for alternately supplying fluid to one of said vessels while discharging fluid contained in another of said vessels; a float disposed in each vessel; a recording means mounted outside each vessel; and a recording means actuating shaft extending from within the vessel to the recording means, said shaft having means therein permitting actuation of the recording means continuously only during an increasing liquid level in the vessel.

References Cited in the file of this patent

UNITED STATES PATENTS

| | | |
|---|---|---|
| 1,062,937 | Wallem | May 27, 1913 |
| 1,393,931 | Alger | Oct. 18, 1921 |
| 1,453,716 | MacGill | May 1, 1923 |
| 2,366,808 | Schultz | Jan. 9, 1945 |
| 2,607,640 | Bergman | Aug. 19, 1952 |
| 2,717,516 | Swift et al. | Sept. 13, 1955 |